(12) United States Patent
Wu

(10) Patent No.: US 6,446,798 B1
(45) Date of Patent: *Sep. 10, 2002

(54) PACKAGE SYSTEM FOR A DATA LOGGER

(75) Inventor: Frederick L. Wu, Pleasanton, CA (US)

(73) Assignee: Deltatrak, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/705,986

(22) Filed: Nov. 3, 2000

Related U.S. Application Data

(63) Continuation of application No. 09/111,290, filed on Jul. 7, 1998, now Pat. No. 6,142,298.

(51) Int. Cl.[7] .............................................. B65D 85/38

(52) U.S. Cl. ..................... 206/305; 206/320; 206/701

(58) Field of Search ................................ 206/305, 320, 206/576, 701, 702, 722, 723, 775–778; 229/87.01, 87.06, 87.18, 92, 122

(56) References Cited

U.S. PATENT DOCUMENTS

| | | | | |
|---|---|---|---|---|
| 2,058,648 A | * | 10/1936 | Wellman | 206/769 |
| 2,755,982 A | * | 7/1956 | Vander Lugt, Jr. | 206/723 |
| 4,669,001 A | * | 5/1987 | Thrush | 206/320 |
| 5,279,410 A | * | 1/1994 | Arashima et al. | 206/723 |
| 5,803,267 A | * | 9/1998 | Tu et al. | 206/576 |

* cited by examiner

*Primary Examiner*—Luan K. Bui
(74) *Attorney, Agent, or Firm*—Theodore J. Bielen, Jr.

(57) ABSTRACT

A package system for a data logger utilizing a base member which is capable of underlying the data logger. A first flap is movably connected to the base member and overlies the data logger. The first flap possesses an aperture for viewing certain signal generating items and switches and allows access to a vent on the data logger. A second flap is also movably connected to the base member and overlies the first flap. A second aperture is smaller than the first aperture, but still permits viewing of certain signal generating portions of the data logger. Means is also provided for mechanically and electrically accessing the data logger for the purpose of inputting and outputting data.

5 Claims, 4 Drawing Sheets

PACKAGE SYSTEM FOR A DATA LOGGER

This is a continuation of application Ser. No. 09/111,290, filed Jul. 7, 1998 U.S. Pat. No. 6,142,298.

BACKGROUND OF THE INVENTION

The present invention relates to a novel and useful system for providing a package for a data logger.

Data loggers are employed in many industries to ascertain environmental parameters such as temperature, pressure, humidity, and the like over a period of time. In many cases, data loggers include memory chips or strip charts for electronic recording. Typically, data loggers include probes or sensors which measure product environmental parameters and are connected to the data logger. In addition, the body of the data logger itself may include sensors to detect conditions, such as humidity, which do not require a probe. Moreover, data loggers are capable of downloading such data through a mechanical multi-pin connector an infrared or RF transmitter, and the like, normally found in a PC system to permit processing through a data base.

Typically, data loggers must be protected from mechanical abuse during usage to ensure accurate recording of environmental data. After recording such data, data loggers are often required to be repackaged and mailed to a central site for downloading or reprocessing.

A package system for a data logger which protects a data logger during usage and yet permits ready access to the same for recording environmental parameters would be a notable advance in the instrument field.

SUMMARY OF THE INVENTION

In accordance with the present invention a novel and useful package system for a data logger is herein provided.

The package system of the present invention utilizes a base member which generally serves as a platform that underlies or supports the data logger when placed on a horizontal surface. The base member may take the form of a plate-like structure.

A first flap is movably or rotatably connected to the base member to permit the first flap to overlie the base member and the data logger. The first flap includes a relatively large first aperture which permits viewing of certain portions of the data logger when the first flap is rotated into position over the data logger. For example, activation switches, signal generating portions indicating activation of the data logger, visual alarms indicating exceeding of certain parameters, and the like. The first flap forms a container with an inner chamber for at least partially enclosing the data logger. The data logger may be fastened within the first chamber by use of fasteners, adhesives, and the like between the data logger and the base member.

A second flap, also movably or rotatably connected to the base member, overlies the first flap. The second flap includes a second aperture for viewing only the signal generating portion of the data logger. A space or cavity is formed by the first and second apertures of the first and second flaps to provide a passageway through the second aperture to the surface of the data logger. Such convective or fluid access to the data logger allows sensors in the data logger itself to readily react to the environmental conditions in which the data logger is placed.

In addition, the container formed by the first flap forms a container which at least partially encloses the data logger. Means is also provided for electrically, and mechanically accessing the data logger in the chamber formed by the container. Such electronic accessing means may include a first opening or first and second openings at opposite ends of the chamber. In this regard, sensors may be electrically or mechanically connected into the data logger and conductors may be extended therefrom for use with terminal probes, such as temperature probes. In addition, a multi-pin connector, or infrared RF transmitter/receiver may be employed to download the data logger through one of the openings. Moreover, means is also provided for holding an elongated probe within the chamber formed by the base member and the first flap. Such means may take the form of a space or well located at the side of the data logger. Where multiple probes are employed, spaces may be provided on either side of the data logger within the chamber of the container.

Following employment of the data logger, first and second flaps may be sealed and end tabs may be employed to enclose the first and second openings used for the electrical and mechanical access to the data logger. When such a process is performed, the package becomes a mailing container. Indicia pertaining to mailing as well as bar code information may be found on one side of the mailing container. Thus, the enclosed data logger can be sent to a processing center for downloading and recycling or reprocessing.

It may be apparent that a novel and useful package system for a data logger is herein provided.

It is therefore an object of the present invention to provide a package system for a data logger which is capable of protecting a data logger from mechanical abuse and still permits electrical access to the data logger for recording environmental parameters and downloading of the same.

Another object of the present invention is to provide a package system for a data logger which is capable of storing and permitting retrieval of data recording probes.

A further object of the present invention is to provide a package system for a data logger which permits the user to ascertain activation and operation of the data logger while the data logger is protected by the system of the present invention.

Yet another object of the present invention is to provide a package system for a data logger which includes provision of wire connected probes and also provides fluid or convective access to the data logger while protected by a container.

Another object of the present invention is to provide a package system for a data logger which may be converted into a mailing package following use of the data logger in a transportation vehicle.

The invention posses other objects and advantages especially as concerns particular characteristics and features thereof which will become apparent as the specification continues.

Figure 1:
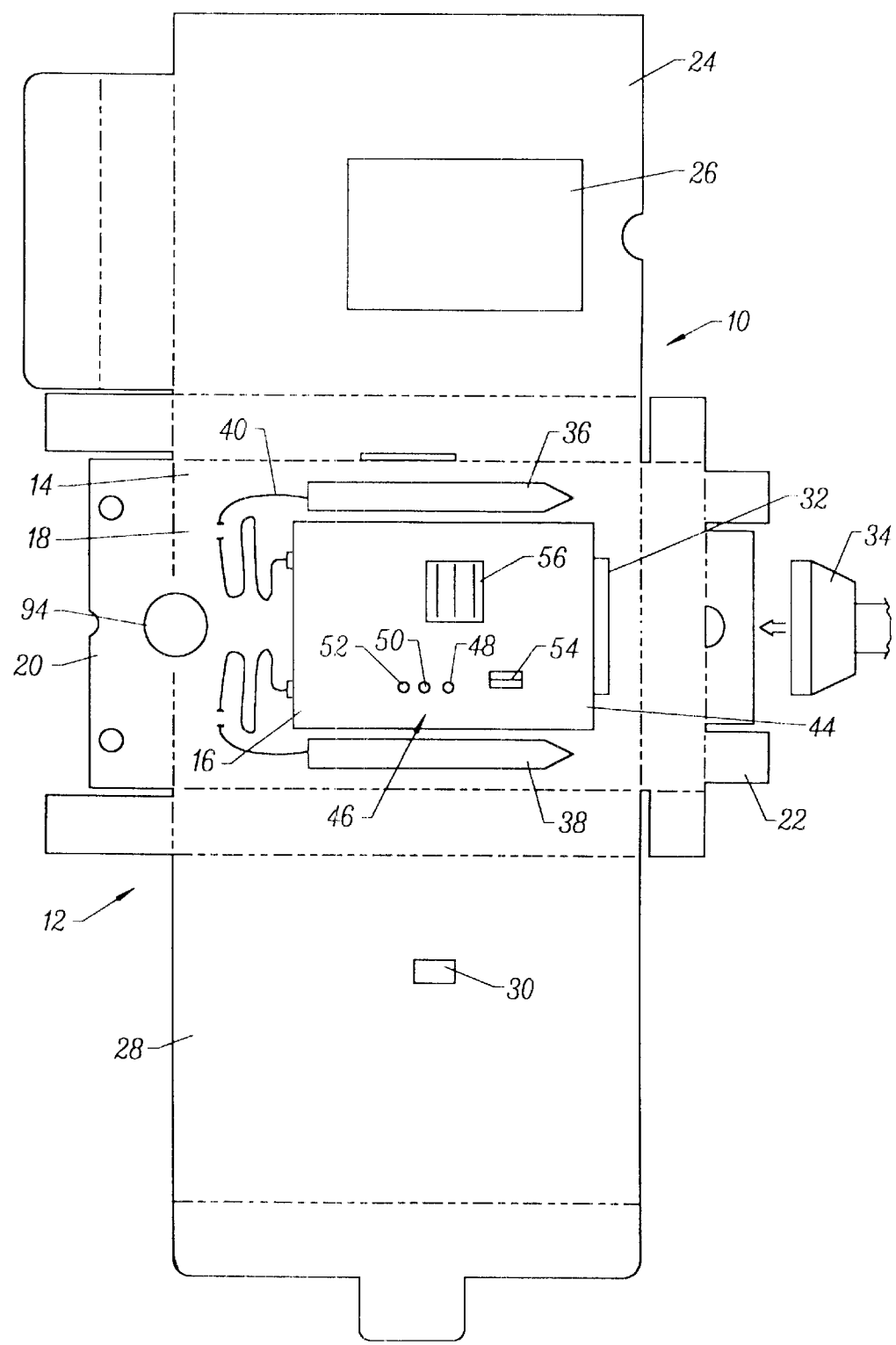
FIG. 1 is a top plan view of the package system of the present invention in its open configuration.

References made to the following detailed description of the preferred embodiments which should be taken in conjunction with the prior described drawings.

DETAILED DESCRIPTION OF THE PREFERRED EMBODIMENTS

Various aspects of the present invention will evolve from the following detailed description of the preferred embodiments which should be read in conjunction with the prior described drawings.

The invention as a whole is shown in the drawings by reference character 10. The package system 10 includes a one piece blank 12 which may be composed of paper, plastic, wood, or any other semi-rigid or rigid material. Blank 12 includes as one of its elements a base member 14 which underlies a data logger 16. Base member includes a central portion 18 and end tabs 20 and 22. Data logger may be of the type sold under the Trademark FLASH LINK by DeltaTRAK, Inc. of Modesto, Calif. Normally, data logger 16 may also be referred to as an in-transit recording device employed for the purpose of obtaining environmental parameters such as temperature, pressure, humidity, and the like over a period of time. Typically, such periods of time correspond to journeys or trips by transportation vehicles such as trucks, trains, boats, planes, and the like. In many cases, such transportation vehicles carry cargo which must be kept within certain environmental parameters. Data logger 16 provides an historical record of such parameters as proof that damage to the cargo has not occurred by exceeding any of such environmental parameters. For example, it may be important that produce be kept below a certain temperature during a trip.

FIG. 1 further illustrates the structure of system 10 in which a first flap 24 is movably or rotatably connected to base member 14. Throughout the drawings, alternating dash and dot lines generally indicate fold lines of system 10. First flap 24 is provided with an aperture 26 of relatively large configuration. In addition, base member 14 includes a second flap 28 possessing a second aperture 30 of relatively small size. Both first aperture 26 and second aperture 30 pass completely through first flap 24 and second flap 28, respectively. The significance of the arrangement of first and second flaps 24 and 26, as well as first and second apertures 26 and 30, will become apparent as the specification continues.

Data logger 16 is also depicted in a configuration atop base member 14 as having a multi-pin connector 32 for accepting a multi-pin jack 34 typically used with a PC device. The interconnection of jack 32 and connector 34 permits downloading of data from data logger 16. In addition, probes, or sensors, 36 and 38 are shown beside data logger 16 atop base member 14. Such probes may be employed to record temperature and the like. Wires 40 and 42 jacked into data logger 16 permit extension of probes 36 and 38, respectively from data logger 16. In certain cases, wires (shown schematically) may extend three to five feet from data logger 16. The top portion 44 of data logger 16 possesses a signal generating portion 46, which, in the present embodiment, includes lamps 48 and 50 that may be used to indicate activation of data logger 16, as well as an alarm showing that a parameter, such as temperature, has been exceeded in the environment where data logger 16 has been placed. Other visual elements may suffice for signal generating portion, such as LCD displays. Activation switch 52 permits the user to start data logger by pressing the same. In addition, vent 54 connects to a sensor within data logger 16 (not shown) to allow the recording of relative humidity. Label 56 allows the user to mark identifying indicia on data logger 16.

Figure 2:
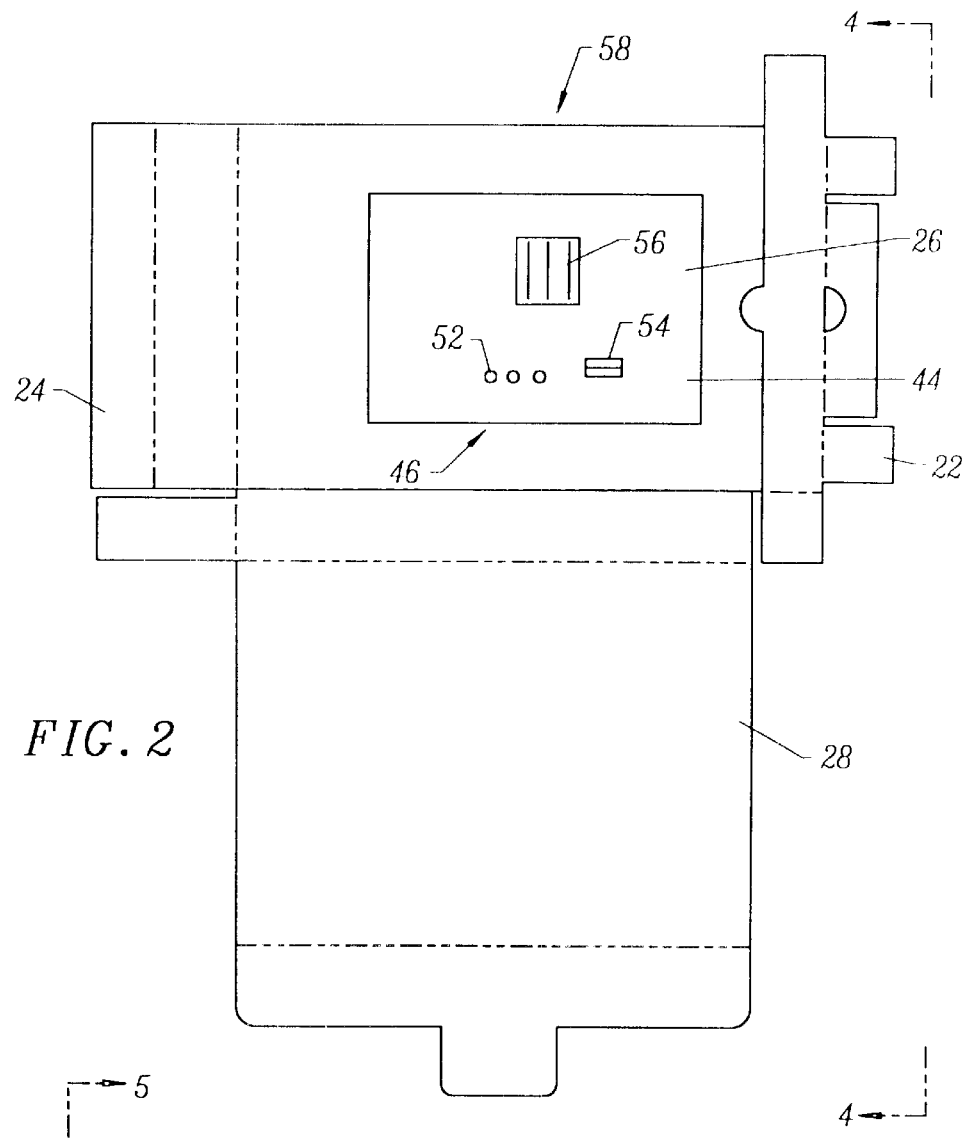
FIG. 2 is a top plan view of the package system of the present invention after one flap has been moved over the data logger.

Referring now to FIG. 2, it may be observed that first flap 24 has been folded or rotated over base member 14 and data logger 16. Aperture 26 permits the viewing of signal generating portion 46 and allows the user to press activation switch 52, prior described. Humidity vent 54 and label 56 are also accessible. At this juncture, base member 14 and first flap 24 form a container 58 with an inner chamber 60, best shown in FIG. 4. In this regard, directional arrow 62 indicates the direction of moving or rotating of first flap 24.

Figure 3:
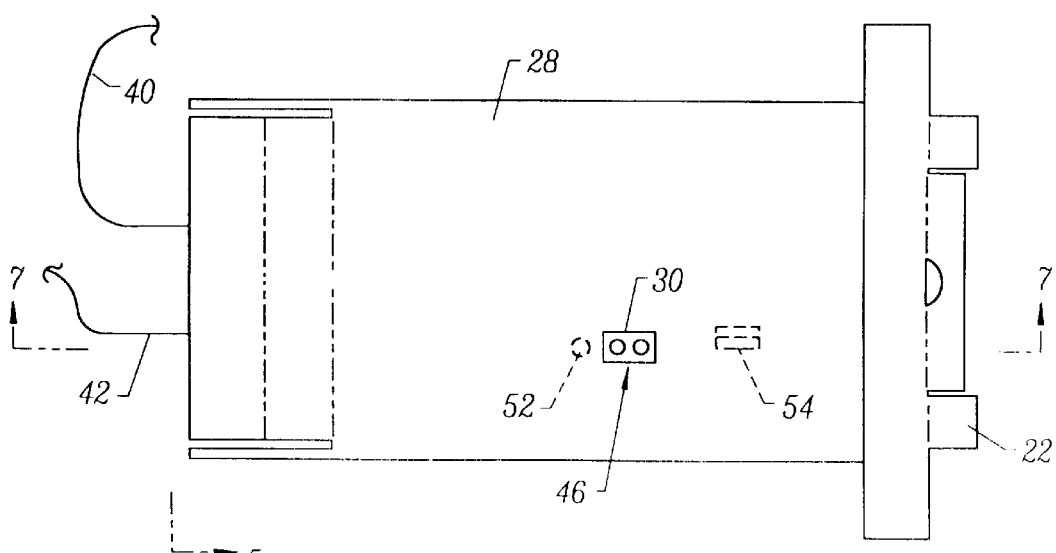
FIG. 3 is a top plan view of the package system of the present invention where the second flap has been placed over the first flap.
Figure 4:
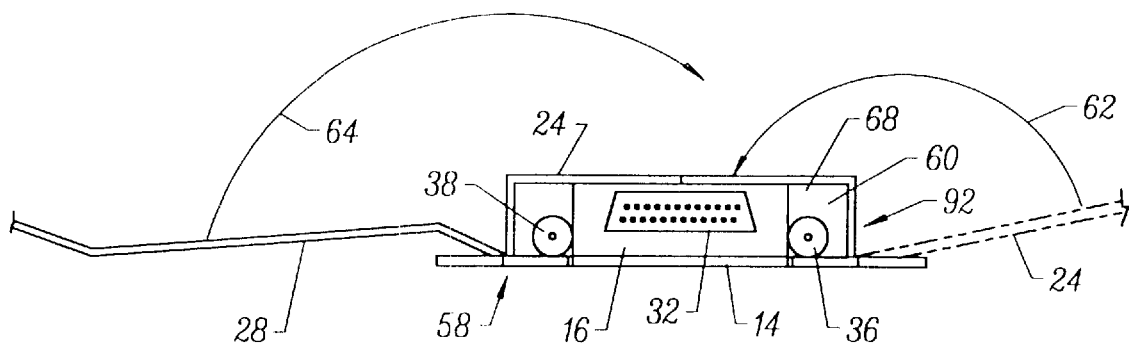
FIG. 4 is a right side end view of the configuration of the data logger depicted in FIG. 2 taken along line 4—4 of FIG. 2.
Figure 5:
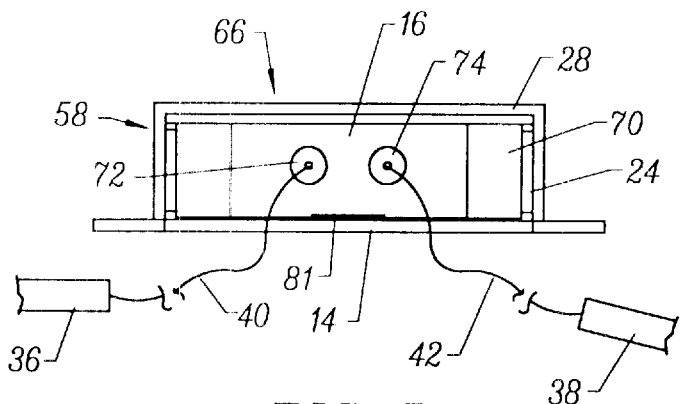
FIG. 5 is a left side end view of the configuration of the system of the present invention taken along line 5—5 of FIG. 3.

Viewing now FIG. 3, with FIGS. 4 and 5, it may be apparent that second flap 28 has been rotated over first flap 24. Although switch 52 is covered by second flap 28 second relatively small aperture 30 permits the user to view signal generating portion 46. Directional arrow 64 of FIG. 4 shows the movement of second flap 28 in this regard. With further reference to FIGS. 4 and 5, it may be observed that means 66 is depicted for electrically, and mechanically accessing data logger 16. Means 66 may take the form of openings 68 and 70 on either end of container 58. For example, opening 68 permits multi-pin jack 32 to be engaged by connector 34, as previously noted. In addition, opening 68 may serve to permit data transfer via an infrared, RF or similar transmitter/receiver system. Opening 70 allows probes 36 and 38 to be extended from data logger 16 and also permits the interconnection of jacks 72 and 74 to data logger 16 at the termini of wires 40 and 42, respectively.

Figure 7:
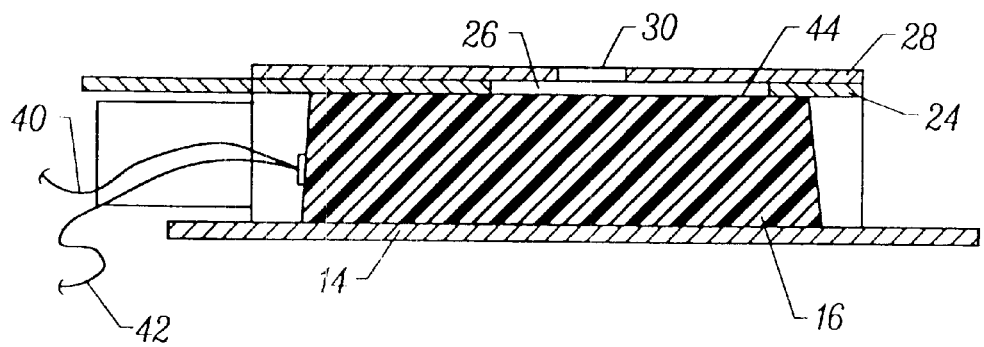
FIG. 7 is a sectional view taken along line 7—7 of FIG. 3.
Figure 8:
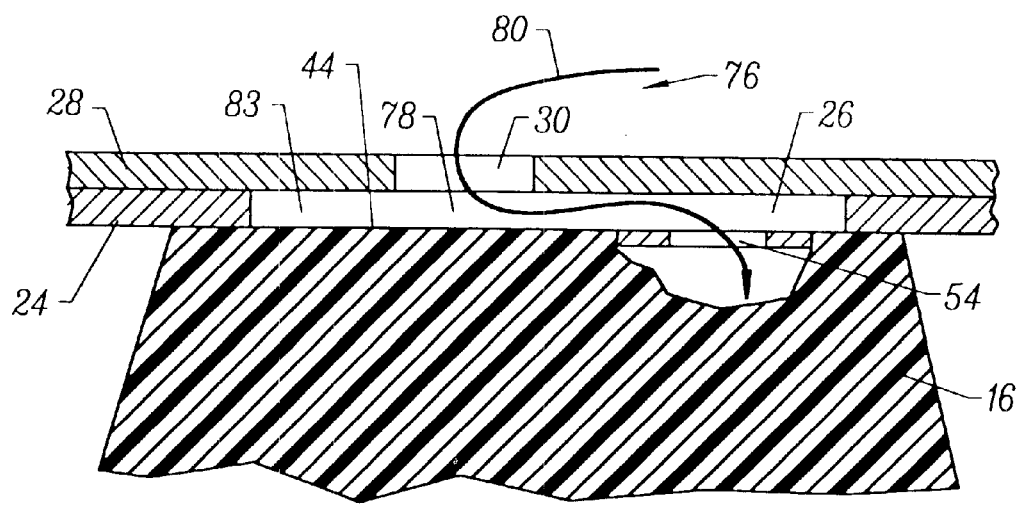
FIG. 8 is an enlarged sectional view of FIG. 7 showing the upper portion thereof and illustrating fluid access to the data logger.

FIGS. 7 and 8 illustrate means 76 for fluid or convective access to data logger 16. Means 76 includes a passage way 78 which extends through apertures 30 and 26 to relative humidity vent 54. Directional arrow 80 indicates a typical path of ambient air to vent 54, in this regard. Thus, the combination of flaps 24 and 28 form a cavity 83 above surface 44 of data logger 16 to prevent inadvertent sealing of vent 54 during use. Returning to FIG. 5, it should be noted that adhesive layers 81 or other fastening means holds data logger 16 to base 14 to prevent movement of the same within chamber 60.

Figure 6:
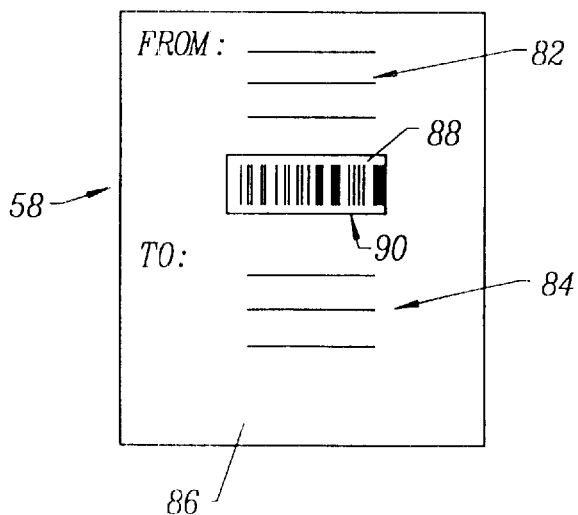
FIG. 6 is a bottom plan view of the package system of the present invention in its mailing configuration.

FIG. 6 represents the configuration of system 10 in which flaps 24 and 28 have been overlain and tabs 20 and 22 have been tucked into container 58 to shut openings 68 and 70. The configuration shown in FIG. 6 is essentially a rectangular box that is ready to be mailed. FROM indicia 82 and TO indicia 84 are schematically depicted on bottom surface 86. An opening 88 through bottom 86 reveals a bar code 90 printed on data logger 16.

In operation, the user places data logger 16 on base member 14 and holds the same there with fastener 81. Probes 36 and 38 are tucked into side portion of data logger 16. Flap 24 is then rotated over data logger 15 to form container 58 with inner chamber 60. Also, means 92 for holding probes 36 and 38 is formed, Large aperture 26 of flap 24 permits the user to mark indicia on label 56 and to contact activation switch 52 for data logger 16. Second flap 28 is then rotated over first lap 24, FIGS. 3, 4, and 5, such that small second aperture 30 only reveals signal generating portion 46 of data logger 16, consisting of lamps 48 and 50 in the present embodiment. Vent 54 for measuring relative humidity is connectively accessible by means 76 via passage way 78 and cavity 83. Thus, ambient air may pass from the environment surrounding system 10 to relative humidity vent 54, directional arrow 80 of FIG. 8. Means 66 permits electrical access to data logger 16 where jacks 72 and 74 may be engaged to activate probes 36 and 38. Probes 36 and 38 are extended away from data logger 16, being connected to wires 40 and 42. In addition, multi-pin jack 32 is accessible for computer connector 34 to download data from data logger 16, if desired. After use, probes 36 and 38 are placed again within chamber 60 and tabs 20 and 22 are closed covering openings 68 and 70 to chamber 60. It should be noted that tab 20 may be removed if desired. Opening 94 of tab 20 permits container 58 as shown in FIG. 3 to be mounted on a hook or nail if desired. When the configuration depicted in FIG. 6 is formed, data logger 16, within container 58, may be mailed to a data processing center for downloading of information or for reprocessing. Bar code 90 and opening 88 permits one to readily identify data logger 16 at this juncture.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A package system, comprising:

a. a data logger having an activation switch and a signal generating portion indicating activation of said data logger;

b. a base member for underlying said data logger;

c. a first flap movably connected to said base member to permit said first flap to extend from said base member and to overlie said data logger, said first flap and said base member at least partially encircling said data logger, said first flap including an aperture surrounded by said first flap said aperture intended for permitting viewing of of an activation signal generated by said signal generating portion of said data hopper;

d. a second flap connected to said base member and extending from said base member underlying said data logger, said second flap overlying at least a portion of said first flap to form a container for said data logger, said container having an inner chamber for at least partially enclosing said data logger;

e. means for accessing said data logger activation switch while said data logger is at least partially enclosed in said inner chamber of said container; and f. a surface on said container externally located relative to said inner chamber, said surface including mailing indicia.

2. The system of claim 1 which further comprises means for restricting movement of said data logger within said container.

3. The system of claim 1 which further comprises means for mounting said container to an object.

4. The system of claim 1 which additionally comprises means for holding an elongated probe within said chamber.

5. The system of claim 4 in which said member for holding an elongated probe comprises a space, formed by said first overlying flap, said space located between said first overlying flap and the data logger.

\* \* \* \* \*